Jan. 26, 1954     E. F. HENDERSON     2,667,523
APPARATUS FOR MANIPULATING SODERBERG ELECTRODES
Filed Sept. 7, 1951     7 Sheets-Sheet 1

INVENTOR.
EDGAR F. HENDERSON
BY James E. Toomey
ATTORNEY

INVENTOR.
EDGAR F. HENDERSON

Jan. 26, 1954 E. F. HENDERSON 2,667,523
APPARATUS FOR MANIPULATING SODERBERG ELECTRODES
Filed Sept. 7, 1951 7 Sheets-Sheet 5

INVENTOR.
EDGAR F. HENDERSON
BY
James E. Toomey
ATTORNEY

Jan. 26, 1954  E. F. HENDERSON  2,667,523
APPARATUS FOR MANIPULATING SODERBERG ELECTRODES
Filed Sept. 7, 1951  7 Sheets-Sheet 6

INVENTOR.
EDGAR F. HENDERSON
BY
James E. Toomey
ATTORNEY

FIG. 9.

Patented Jan. 26, 1954

2,667,523

UNITED STATES PATENT OFFICE 2,667,523

APPARATUS FOR MANIPULATING SODERBERG ELECTRODES

Edgar F. Henderson, Tacoma, Wash., assignor to Kaiser Aluminum & Chemical Corporation, Oakland, Calif., a corporation of Delaware Application September 7, 1951, Serial No. 245,594

16 Claims. (Cl. 13—18)

This invention relates to continuous or self-baking electrodes, and has reference more particularly to the general assembly of the casing therefor.

This invention, while utilizing certain features known in the continuous electrode art, has for its primary object an improvement in the electrode casing structure for reducing the capital and maintenance costs and the time and labor expended in the use and operation of the conventional self-baking electrode as, for example, in an aluminum reduction cell or furnace. Historically, particularly in the aluminum industry, the trend has been to larger and larger cells or furnaces, necessitating larger and stronger casing structures with corresponding increases in handling difficulties. My novel casing structure is characterized by lightness, ease of handling and yet being sufficiently strong for use with large electrodes.

Heretofore, various electrode casing assemblies have been devised, but the use of these known structures involve certain disadvantages. One such structure, disclosed in U. S. Patent No. 2,073,356 to P. Torchet, comprises a consumable casing or mantle in contact with the sides of the electrode and surrounding this casing or mantle are alternately stacked channel iron beams. These beams overlap at their ends, said ends being slotted lengthwise to receive supporting bolts, one for each corner of the stacked beam arrangement, thus constituting a knockdown open framework electrode holder. The electrode is provided on the opposing long sides with rows of metal contact studs inserted therein, which project from between the spaced beams surrounding the casing or mantle. Such a structure, however, has the disadvantage that since the beams are alternately stacked there is exposed a certain area of the electrode surface on two sides just above the bath in the cell or furnace. Although there is provided a casing or mantle, this is a consumable casing and often melts when it nears the surface of the bath leaving that area of the electrode formerly covered by the casing subject to oxidation by the air. In addition, the removal of the lower pair of beams from the bottom of the holder during operation exposes an even greater area of casing and consequently of the electrode when the casing melts. A further disadvantage with such a structure is that with the alternate beams it is very difficult to get the studs in any one row in the same plane and at the same angle resulting in variation in the elevation of the inserted tip and consequently a variation in current path at the bottom of the anode.

Another electrode casing structure is that of J. L. Legeron, U. S. Patent No. 2,169,563, wherein the casing comprises rows of superimposed beams surrounding the electrode and presenting a continuous inner surface to the electrode, thus eliminating the need for a consumable mantle or inner casing as in the Torchet patent. The Legeron structure has the disadvantage of necessitating the handling of a larger number of beams as the lower row is dismantled and replaced on top of the uppermost row. With electrodes of the sizes now in use, these beams are very large and heavy, thereby requiring special lifting apparatus to hold them while they are being detached from each other at their ends and for lifting and holding them in proper position for reassembly on top of the uppermost row of beams. Another disadvantage is that the weight of the electrode and casing is substantially completely supported by the bus bars through the current carrying bars which connect the bus bars to the contact studs imbedded in the electrode. Since the bus bars and connector bars are normally made of high conductivity metal, such as copper or aluminum, they have to be relatively massive in cross sectional area to sustain the weight of the electrode plus the casing.

Another known electrode casing structure is that disclosed by M. O. Sem in U. S. Patent 2,159,183, wherein instead of using removable beams Sem provides a permanent casing in the form of a continuous shell which is supported at the top and extends downwardly to near the surface of the bath. This casing is provided with vertical slots through which the contact studs extend, thus allowing the electrode and imbedded studs to pass down through the casing until the lowermost row of studs rests on the casing at the bottom of the slots. The electrode is supported in part by frictional engagement with the casing, but at least one-half of its weight must be carried by the current conducting straps between the bus bars and the contact studs. This structure, therefore, carries with it the disadvantages that the current connector bars have to support at least 50% of the load of the electrode at all times when the lowermost row of contact studs are not resting on the bottom of the slots, and that due to the use of a permanent casing with slots there is a possibility of the extrusion of a portion of the electrode mass near the upper portion of the slots making the use of aluminum plate between the contact studs necessary. Another disadvantage with the Sem structure is that the anode is subject to growth as it passes through the plastic to solid stage and since there is little restraining strength in the casing alone, however heavy, it is difficult to closely control the baked anode shape.

Many of the disadvantages of prior electrode casings and holders, as mentioned above, are overcome or alleviated by the structure of the invention. Broadly speaking, the casing structure comprises the provision of a permanent stationary casing supported from the top, said casing having relatively long downwardly extending portions on the opposing sides of the short dimension of the electrode and having relatively short downwardly extending portions on the opposing sides of the long dimension of the electrode. Covering the electrode on its long dimension in the areas not covered by the casing are horizontal superimposed rows of channel beams presenting a continuous inner surface. The ends of the two beams in each row are connected together by the use of tie rods extending across the short dimensions of the electrode. This invention also includes a modification of the above channel beam structure wherein the horizontally arranged beams in each row are spaced apart.

The invention is described in greater detail in conjunction with the accompanying drawings which are schematic and in no way constitute a limitation upon the invention herein disclosed or the claims appended hereto.

Figure 1:
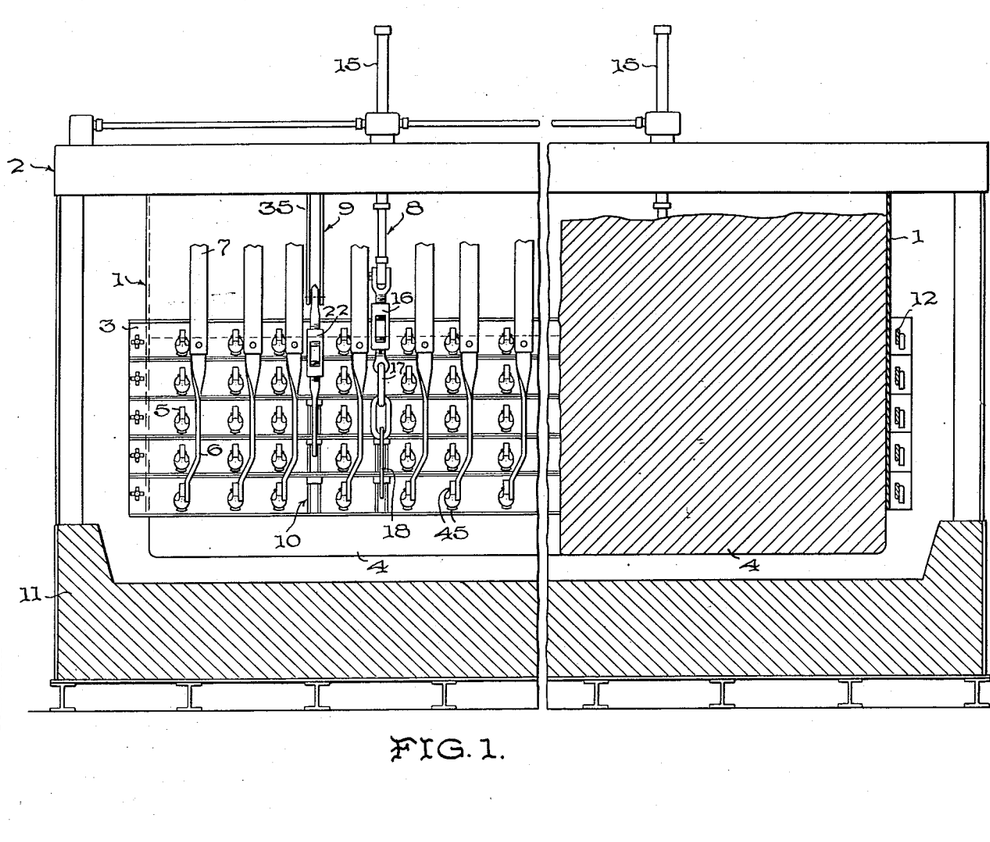
Figure 1 is a longitudinal elevation, partly broken away in vertical section, illustrating the invention as applied to an aluminum reduction cell or furnace in which one electrode is employed.

With reference to the drawings, the arrangement illustrated in Figure 1 is of an aluminum reduction cell employing an electrode 4 of the Soderberg self-baking continuous type.

The electrode, which is rectangular in cross section consists of a lower baked portion and an upper unbaked portion, and electrode paste is added to the top thereof to compensate for consumption of the carbon at the bottom which is immersed in the melt. Thus, the electrode is continuous and self-baking, the baking being accomplished as the electrode is lowered in its casing or holder by the heat generated in the melt and the electrode itself by the current passing through the lower portion thereof.

Figure 2:
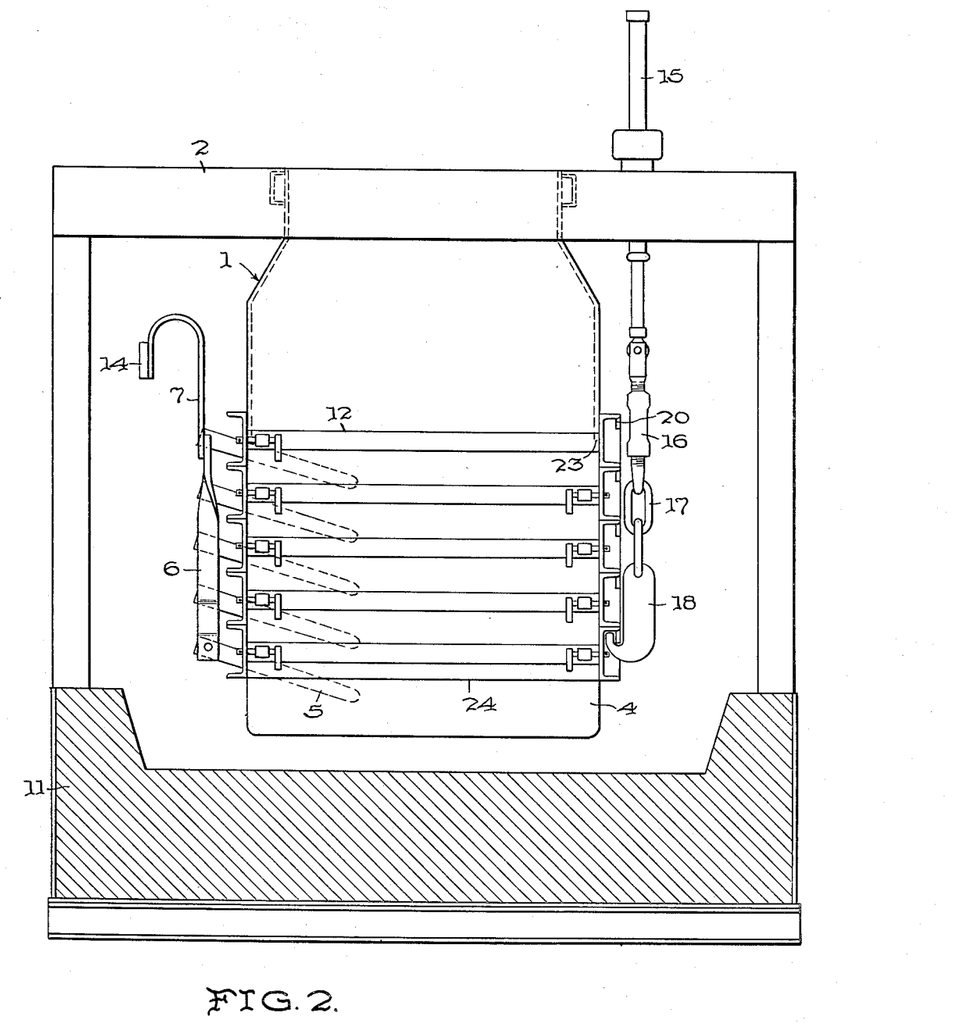
Figure 2 is a transverse elevation, with parts removed of the apparatus shown in Figure 1, illustrating primarily the use of tie rods connecting the ends of the horizontal channel beams, the use of the permanent casing having a short skirt portion on its longitudinal dimension, and the primary suspension means particularly with respect to the hooking arrangement with the channel beams.

A permanent casing 1 is suspended from the superstructure 2 which is mounted on furnace 11, this casing extending down only a relatively short distance on the longitudinal sides of the electrode to a line just above the contact stud apertures of the uppermost beam 3 as shown in better detail in Figure 2. On the ends or transverse dimensions of the electrode, the casing extends downwardly at least to a line where the electrode material is thoroughly baked and may extend down to a line flush with the bottom of the lowermost row of beams 3 as shown in section in Figure 1. The lowermost extent of the downwardly extending end portions is governed partially by the possibility of damage due to the higher temperatures as the bottom of the end portion nears the furnace bath. A series of superimposed contiguous channel beams 3 horizontally disposed in planes perpendicular to the vertical axis of the electrode are located along the two longitudinal sides of the electrode. Each pair of channel beams in a corresponding horizontal plane are connected by suitable locking pins, as illustrated more in detail in Figure 6, at their respective ends with tie rods 12 extending across the electrode width and serving also to reinforce the downwardly extending portions of the permanent casing on the ends of the electrode. Thus, individual frames are formed and the pair of channel beams in each frame rests upon the corresponding pair of the next lower frame through the medium of the channel beam flanges. The channel beams 3 and tie rods 12, together with the permanent casing extensions on the end of the electrode, thus form in effect a complete mold or casing for the electrode, the channel beam-tie rod assembly being movable with the electrode and the permanent casing being fixed. In modern day furnaces or cells these channel beams may be ten to twenty feet or longer in length.

Figure 10:
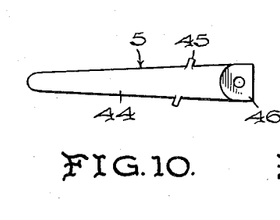
Figure 10 is a side view of a contact stud employed, illustrating the use of upper and lower, angular lug portions for properly positioning the stud within the electrode mass.
Figure 11:
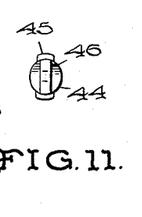
Figure 11 is an end view of the contact stud illustrated in Figure 10.

Contact studs 5, as shown in Figures 10 and 11, which comprise a shank portion 46 and a tapered body portion 44, are inserted into the electrode at an angle from the horizontal in horizontal rows through appropriate holes or apertures 13 in each of the channel beams 3 along their length. The studs are inserted into the upper unbaked portion of the electrode. As can be seen from Figures 10 and 11, each stud is provided with an upper and a lower lug portion 45. These integral lug portions 45, 45 lie in a plane at an oblique angle to the longitudinal axis of the stud and the surface of the lugs facing the inner end of the stud are substantially flat. When the studs are inserted through holes 13 and into the electrode mass the lugs 45, 45 will abut against the outer surface of the channel beam web portion and thereby accurately position each stud in the desired relationship within the electrode mass. The studs of the row extending through the lowest pair of channel beams are individually connected to current carrying bars 6, which at their upper extremities are attached to flexible cables 7 in turn connected to the fixed anode bus bars 14. Thus, current is supplied only to those studs which are firmly baked into the lower baked portion of the electrode, the unbaked portion of the electrode being relatively non-conductive.

Figure 7:
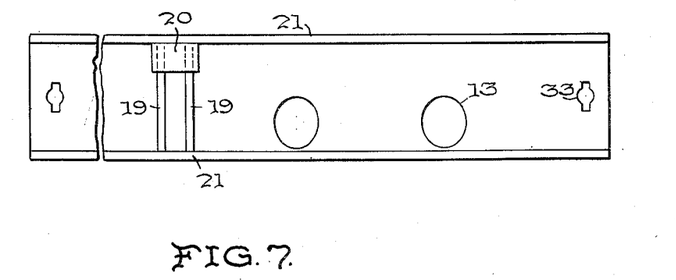
Figure 7 is a fragmentary elevation of one of the horizontal beams illustrating in more detail the locking aperture on the end, the apertures for insertion of the contact studs and the means for attaching the suspension hooks to the beams.

In the drawings, Figure 1, the primary and auxiliary suspension means for the electrode are designated at 8 and 9, respectively. During normal operation the electrode is supported and lowered by means of the primary suspension means 8 which comprises a suitable jacking system 15 connected to a turnbuckle 16 which in turn is connected to a chain 17 which is secured to a suitable hook 18. The hook 18 is connected to the lowermost beam with the aid of fixture 10, which, as is shown more clearly in Figure 7, comprises spaced web sections 19, 19 which are welded in between the beam flanges 21, 21 and a plate section 20 which overlies the upper ends of webs 19, 19 and is flush with the end of flange 21. Plate section 20 is welded to both webs and to the flange 21. The hook member 18 will readily pass in between web portions 19, 19 with the curved end of the hook passing up under the plate section 20, thereby being locked against longitudinal movement while in hooking engagement with the beam. Thus, the weight of the electrode primarily is upon the lowest rows of contact studs on opposing sides of the electrode and the load is transmitted first to the lowest pair of channel beams and then to the hook, chain and jacking mechanism. The number of primary suspension mechanisms provided on each side of the electrode may be varied depending upon the size of the electrode and consequently the length of the channel beams. It has been found desirable, however, where only two jacking-hook mechanisms are provided on each longitudinal side of the electrode, to use what might be termed "quarter point suspension." By this is meant that the two mechanisms are placed such that one is a quarter of the distance in from each end of the channel beams. Such positioning of the suspension mechanisms results in reducing the stress on the channel beams to a minimum.

The auxiliary suspension means 9, which is provided for the electrode when it becomes necessary to remove the lowest row of studs and pair of channel beams as they approach the bath surface, is directly connected with the superstructure 2 of the cell and comprises suitable suspension means 35 which are permanently connected to the superstructure 2, a turnbuckle 22 which is detachably connected to suspension means 35, and, as in the case of suspension means 8, the turnbuckle 22 is connected to a hook similar to hook 18 and the beams are provided with other fixtures 10 at appropriate locations for receiving the hook, which fixtures are constructed as above described. Under normal operation of the furnace or cell the turnbuckle 22 and attached hook are not suspended from the superstructure 2.

At such time as it is found necessary to move the primary suspension means into hooking engagement with the next higher row of channel beams, the turnbuckle and hook mechanisms are detachably connected to suspension means 35. The turnbuckle and hook mechanisms are thereafter removed when the primary suspension means have been re-connected.

It is to be noted with respect to the apparatus disclosed in Figure 1, that under ordinary practice two or more sets of primary and auxiliary suspension means will be provided on each longitudinal side of the electrode depending upon the length of the electrode, and that for each pair of primary and auxiliary suspension means used, all of the horizontal beams 3 in each vertical row are provided with two hooking fixtures 10 such that the hooks will be able to be successively connected with each of the beams as they pass downwardly and reach the position of next to the lowest and lowest beams in the row. As has been discussed hereinbefore, where only two primary suspension means are provided on each longitudinal side of the electrode they should be spaced for "quarter point suspension" or in other words one such suspension means should be positioned along the length of the channel beams one quarter of the distance or length in from each end of the beams.

Under normal operation of the furnace or cell the lowermost horizontal row of channel beams 3, 3 will move downwardly by means of the primary suspension means to a predetermined point above the furnace bath whereupon the studs of the lowermost row are successively disconnected from the current supplying bars 6, which bars after disconnection are successively raised and reconnected to the corresponding studs in the next higher row. Thus, current can be continuously supplied to the electrode during this changeover. The current is passed through the studs in the next higher row for a sufficient time to insure complete baking of the electrode mass and secure attachment of the studs within the mass. Then the auxiliary suspension means are connected to the next highest row of channel beams in order to allow for disconnecting the hooks 18, 18 of the primary suspension means from the lowest row of channel beams and connection to the pair of channel beams in the next higher row with which the next higher row of studs, now electrically connected, cooperate to support the electrode, and the auxiliary suspension means is disengaged. The studs in the lowermost row of channel beams are then removed from the electrode and the pair of channel beams and tie rods of the lowermost frame are disconnected, removed, and remounted at the top of the electrode casing assembly. Normal operation is then resumed after proper adjustment of the anode-cathode spacing.

Figure 3:
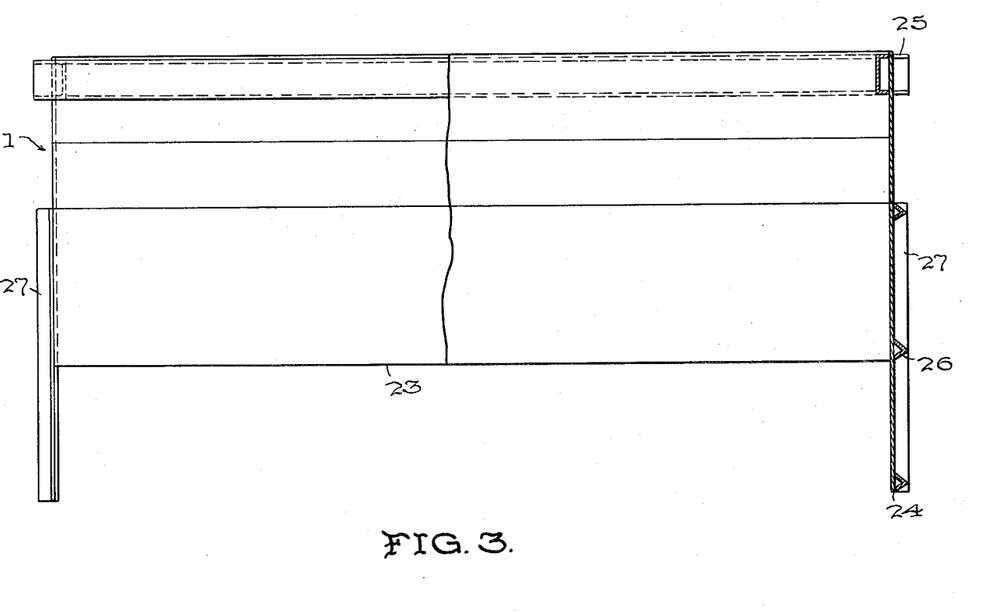
Figure 3 is a longitudinal elevation, partly broken away in vertical section, illustrating in more detail the permanent casing.
Figure 4:
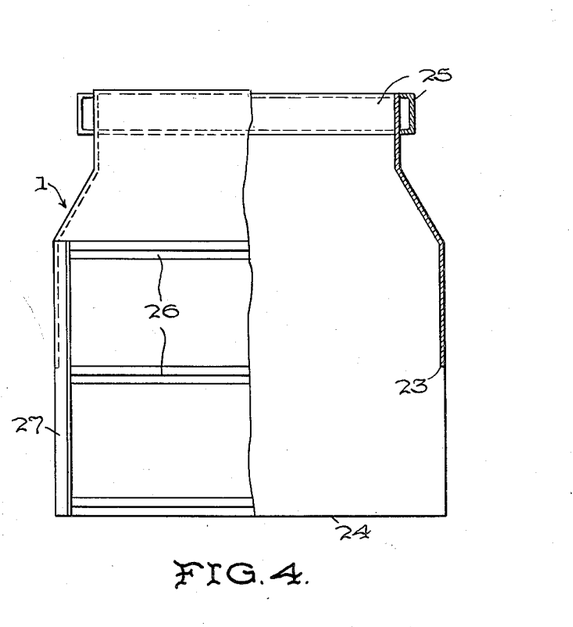
Figure 4 is a transverse elevation partly broken away in vertical section, of the permanent casing illustrated in Figure 3.

The permanent casing 1 is more clearly illustrated in Figures 3 and 4. As can be seen from Figure 3, the longitudinal side portions of the casing extend downwardly and terminate at edge 23 which is just above the top of stud apertures 13 of the topmost beams (as shown in Figure 2) while the end portions of said casing may extend down to edge 24. It is desirable, in making the casing, to use relatively thin gauge iron plate to give lightness to the casing as a whole and then reinforce the casing around the upper rim by means of a channel beam 25 welded thereto, as illustrated in Figure 4. The end extending side portions of the casing may also be suitably reinforced by means of horizontal angle irons 26, 26, 26 and vertical angle irons 27, 27 welded thereto. The necessity of reinforcing means, such as 26 and 27, will depend upon the strength of the casing in combination with the reinforcing effect of the beam-tie rod framework. Generally I have found it desirable to reinforce the end extensions at least with vertical angle irons 27, 27 since these extensions may not have sufficient resistance to the lateral pressure from the anode mass to prevent these end extensions from being sprung outwardly. Furthermore, the vertical angle irons 27, 27 function as runners for the tie rods as the rods move down the ends of the casing. Where horizontal angle irons are provided it is necessary that the vertical angle irons project outwardly farther than the horizontal angle irons in order to prevent the tie rods from contacting the horizontal angle irons and thereby disrupting the movement of the channel beam-tie rod assemblies downwardly of the casing. Additional vertical reinforcing members may be added toward the center of the end extensions, if so desired.

Figure 5:
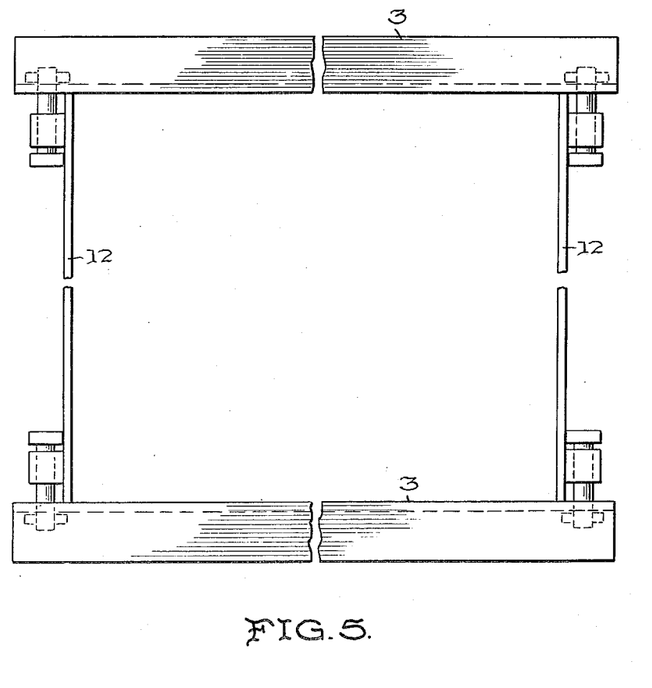
Figure 5 is a plan view illustrating an assembly of one pair of horizontal beams connected at their ends to tie rods.
Figure 6:
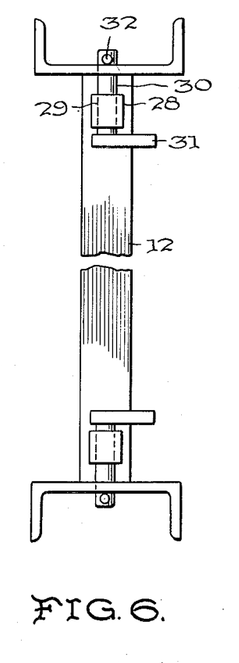
Figure 6 is an end elevation of the apparatus illustrated in Figure 5.

Figures 5 and 6 illustrate a single horizontal frame assembly comprising two channel beams 3 connected at their respective ends to tie rods 12, 12. Figure 6, which is an end elevation of Figure 5 shows in more detail the locking mechanism used. Adjacent the ends of the tie rods is welded a block-like member 28 having an opening 29 therethrough. Passing through opening 29 is a rod 30 having a handle 31 on the inside end and provided with a locking pin 32 on the outside end. The ends of beams 3 each have an aperture 33 of the configuration shown in Figure 7. When handle 31 is at right angle to the tie rod 12, the locking pin 32 is in vertical position such that it may pass through aperture 33. After this pin 32 has passed through aperture 33, handle 31 is moved downwardly to cause pin 32 to move to a horizontal position, thus firmly locking the tie rod to the beam. Such locking mechanism allows rapid assembly and disassembly of the beam and tie rod frames.

In certain instances it may be desirable to interpose between the electrode and the casing suitable material in order to prevent adherence or coking of the electride mass to the channel beams which would render difficult the removal of the various pairs of beams when they reach their lowermost position and the frame is disassembled. There are various materials and methods for performing this function as by providing the inner surfaces of the stationary casing and the beams with a mixture of graphite and oil or alumina and tar. Various types of paper have also been used as a liner between the electrode mass and the casing structure. Another method is to provide a wrapper or inner casing of thin aluminum sheet or foil which is interposed between the permanent casing and the electrode mass as the latter is charged into the upper portion of the casing. This thin sheet adheres to and moves with the electrode during the lowering and baking thereof and is, of course, fed with the electrode into the melt and is there consumed without contamination of the melt.

Figure 8:
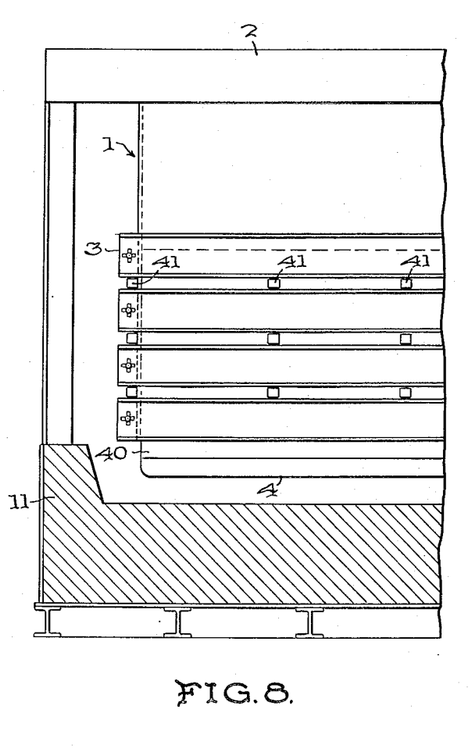
Figure 8 is a fragmentary longitudinal elevation, with parts removed, of a modification of the channel beam structure of Figure 1 and illustrates the use of spaced beams and a metallic sheet or inner casing member; the studs, stud apertures and suspension means being removed for purposes of clarity.
Figure 9:
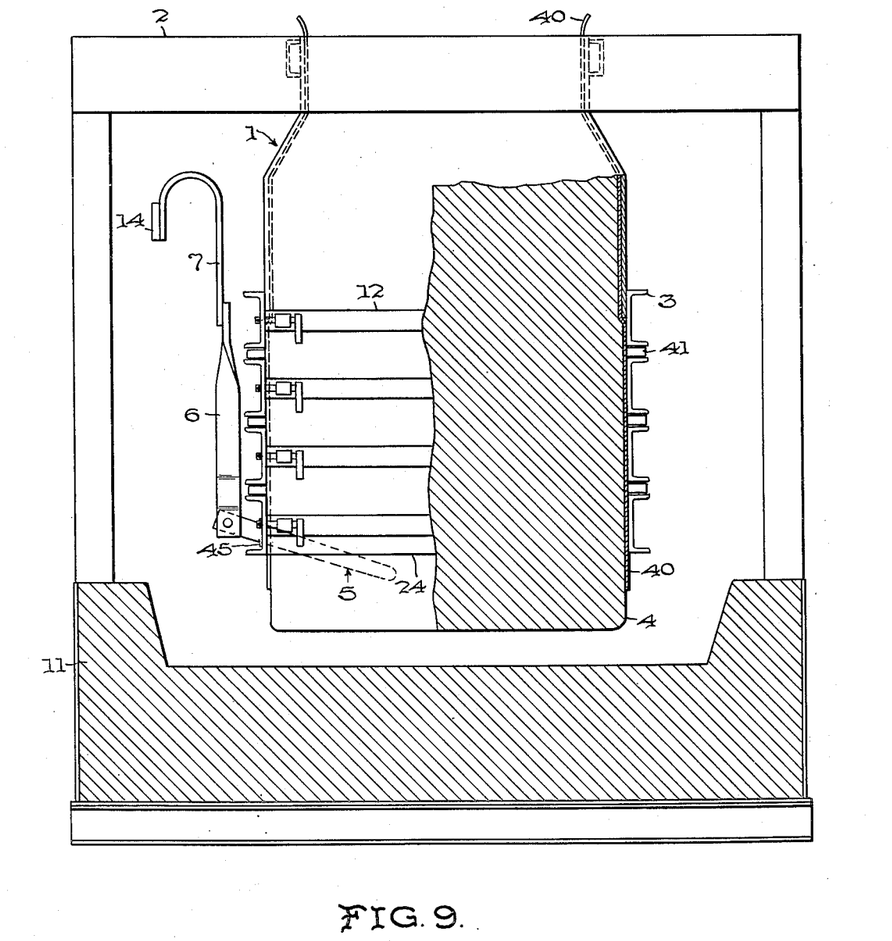
Figure 9 is a transverse elevation, with parts removed, of the apparatus shown in Figure 8, illustrating primarily the use of spacer elements between the channel beams and the use of the metallic sheet or inner casing member.

Figures 8 and 9 illustrate one modification of the electrode casing structure shown in Figures 1 and 2. As can be seen from Figures 8 and 9, the pair of channel beams 3, 3 in each channel beam-tie rod frame are spaced from the channel beams in adjacent frames by means of relatively light metallic spacer elements 41 which are positioned between the flanges of the beams. The number of such spacer elements used between each two beams will depend upon the strength and length of the beams. In other words, sufficient spacer elements should be used and so positioned to prevent the channel beams from bowing or sagging. Where the cell is of such size that "quarter point suspension" can be used, it is ordinarily sufficient if two spacer elements be provided between adjacent channel beams, the spacer elements being in line with the primary suspension means. In normal operation the spacer elements 41 are positioned upon the upper flange of the uppermost pair of channel beams and then the lowermost pair of beams which are disconnected from the tie rods and removed from the bottom of the electrode casing assembly are positioned at the top of the electrode casing assembly with their lower flanges resting upon the spacer elements. The pair of channel beams are then again connected to the tie rods. Although the inner end surfaces of the spacer elements 41 need not be flush with the inner surfaces of the channel beams as shown in Figure 9, it is preferable that the spacer elements be so positioned.

When the channel beams are spaced apart by means of spacer elements as shown in Figures 8 and 9, rather than being contiguous as shown in Figures 1 and 2, it necessitates the use of a consumable inner casing 40 of heavier sheet aluminum than would be used, if at all, in the contiguous beam arrangement. The inner casing, in addition to preventing adherence or coking of the electrode mass to the channel beams, also prevents any of the electrode paste material, particularly in the zone of the upper channel beams, from extruding out from between the spaced beams. The inner casing material 40 is fed downwardly into the stationary casing from any suitable source. The height of the spacer elements or, in other words, the distance between adjacent beams, bears a direct relationship to the thickness of sheet of inner casing 40. The heavier the gauge of the inner casing the greater the space that can be provided between adjacent beams. One desirable advantage of this spaced beam arrangement is the reduction of the total number of heavy beams necessary for each side of the electrode casing structure. The number of channel beams which could be removed from the structure would necessarily depend upon the original number of beams used and the height of the spacer elements.

It will thus be seen that by the use of my novel electrode casing structure the ease and rapidity of disassembly and assembly of the various portions of the movable casing has been greatly improved. By the use of tie rods in place of the conventional channel beams which are of considerable weight, workmen can readily handle the tie rods and thus avoid the heavier channel beams and possibly even avoid separate hoist or crane operations on the ends of each reduction cell or furnace in the case of very large pots. By the use of spacer elements between the beams the number of heavy beams can be further reduced. The use of my locking arrangement makes it possible for one man to disassemble a single tie rod from the two adjacent channel beams and then assemble the tie rod on top of the uppermost frame with the channel beams. The provision of the extending end portions of the permanent casing tend to reduce the oxidation and corrosion of the electrode inasmuch as they may extend down to a point approximately equal to the bottom of the lowermost beam at the time of disassembly, thereby only additionally exposing that area of the electrode that was covered by the two lowermost channel beams removed.

Although the preferred use of my novel electrode casing structure has been set forth as applied to an aluminum reduction cell, the various features herein disclosed may be embodied in electric furnaces for use in other general smelting operations, the making of steel, the production of calcium carbide, and other similar fields of applications wherein furnaces utilizing self-baking electrodes are employed.

What I claim is:

1. An electrode casing assembly for a self-baking electrode of substantially rectangular shape comprising a permanent stationary casing member having relatively short downwardly extending longitudinal side portions on the long dimension of the electrode and having relatively long downwardly extending side portions on the short dimension of said electrode, and means being so positioned at each of the short downwardly extending side portions that they form in effect downwardly extending continuations of said short side portions, said means being movable relative to said stationary casing and comprising a vertical row of horizontally stacked channel beams of relatively large cross section, the respective ends of corresponding channel beams in each vertical row being detachably connected to light weight tie rods of relatively small cross section, said tie rods extending across and outside of the long downwardly extending side portions of said stationary casing.

2. An electrode casing assembly as in claim 1 wherein the web portions of each channel beam are provided with a row of spaced apertures adapted to receive contact studs therein.

3. An electrode casing assembly as in claim 2 wherein suspension means are provided on each longitudinal side of said casing structure for hooking engagement with the lowermost horizontal row of channel beams, said suspension means being positioned along the length of said channel beams one quarter of the distance in from each end of each beam.

4. An electrode casing assembly for a self-baking electrode of substantially rectangular cross section comprising a permanent stationary casing having relatively long downwardly extending side portions on the short dimension of the electrode and relatively short downwardly extending side portions on the long dimension of said electrode and having positioned, relative to each of said short downwardly extending side portions, a vertical row of horizontally superimposed channel beams of relatively large cross section, the ends of which extend slightly beyond the ends of said short downwardly extending side portions of said casing such that the inner faces of said superimposed beams in effect constitute downwardly extending continuations of said side portions, said channel beams being provided in the web portion with a row of spaced apertures adapted to receive contact studs therein, the respective ends of the pair of channel beams in each horizontal row being detachably connected to the ends of light weight tie rods of relatively small cross section, said channel beam-tie rod arrangement being movable relative to said stationary casing.

5. An electrode casing assembly for a self-baking electrode of substantially rectangular cross section comprising a permanent stationary casing having relatively long downwardly extending side portions on the short dimension of the electrode and relatively short downwardly extending side portions on the long dimension of said electrode and having positioned, relative to said short downwardly extending side portions, superimposed channel beams of relatively large cross section, the ends of which extend slightly beyond the ends of said side portions of said casing such that the inner faces of said superimposed beams in effect constitute downwardly extending continuations of said side portions, the channel beams being movable relative to the casing, primary suspension means for hooking engagement with the lowermost horizontal row of beams during movement of the electrode and beams downwardly, said primary suspension means being positioned along the length of the pair of channel beams in said lowermost row one quarter of the distance in from each end of each beam, and auxiliary suspension means adapted to be in hooking engagement with the next highest row of beams when the primary suspension means are being unhooked from the beams in said lowermost row and hooked to the beams in the said next highest row.

6. An electrode casing assembly as in claim 5 wherein each beam is provided with means for receiving suspension hooks, said means comprising spaced, vertical, plate-like elements welded to the inner surfaces of the web and flanges of said beam and a flat member overlying the upper ends of said spaced elements and welded thereto and to the flange of the beam.

7. An electrode casing assembly for a self-baking electrode comprising a four-sided, stationary casing member, two opposing sides of which extend downwardly a greater distance than the remaining two opposing sides, and a vertical row of horizontally stacked channel beams of relatively large cross section positioned adjacent each of said remaining two opposing sides such that the inner surfaces of said channel beams in effect provide a downwardly extending continuation of said remaining sides, the respective ends of the pair of channel beams in each horizontal row being detachably connected together by means of light weight tie rods of relatively small cross section, said beams and tie rods being movable with respect to said casing.

8. An electrode casing assembly as in claim 7 wherein the upper longitudinal portion of the pair of channel beams in the uppermost horizontal row overlaps the lower edge of said downwardly extending side portions of which said channel beams form a continuation thereof.

9. An electrode casing assembly as in claim 8 wherein the two opposing side of said casing extending downwardly the greater distance are reinforced by means of spaced angle irons welded thereto in a vertical position, at least one of which is positioned adjacent each vertical edge of said sides, said angle irons adapted to form runners for the tie rods during the downward movement of said tie rods relative to said stationary casing.

10. An electrode casing assembly for a self-baking electrode of substantially rectangular cross section comprising a permanent stationary casing having relatively long downwardly extending side portions on the short dimension of the electrode and relatively short downwardly extending side portions on the long dimension of said electrode and having positioned, relative to each said short downwardly extending side portion, a vertical row of horizontally stacked channel beams of relatively heavy cross section, said channel beams in each vertical row being spaced apart by means of a plurality of spacer elements which are provided between the opposing flanges of adjacent channel beams, the corresponding ends of each pair of channel beams in a horizontal plane being detachably connected to light weight tie rods of relatively small cross section, said channel beams and tie rods being movable relative to the stationary casing, and an inner consumable casing of sheet metal adapted to be forced into contact with the inner opposing surfaces of said beams by the electrode mass as it passes downwardly through the stationary casing.

11. An electrode casing assembly as in claim 10 wherein each channel beam is provided with a row of spaced apertures in the web portion, said apertures adapted to receive contact studs therein.

12. An electrode casing assembly as in claim 11 wherein primary suspension means are provided on each longitudinal side of said casing structure for hooking engagement with the lowermost horizontal row of channel beams, said suspension means being positioned along the length of said channel beams one quarter of the distance in from each end of each beam.

13. An electrode casing assembly as in claim 12 wherein auxiliary suspension means are provided for each primary suspension means, said auxiliary suspension means adapted to be in hooking engagement with the channel beams in the next highest horizontal row when the primary suspension means are being unhooked from the lowermost row of beams and hooked to the beams in said next highest row.

14. In combination with a self-baking electrode of substantially rectangular cross section, an electrode casing assembly comprising a permanent stationary casing having relatively long downwardly extending side portions on the short dimension of the electrode and relatively short downwardly extending side portions on the long dimension of said electrode and having positioned, relative to each of said short downwardly extending side portions, a vertical row of horizontally stacked channel beams of relatively large cross section, the respective ends of each pair of said beams in a horizontal plane being detachably connected to light weight tie rods of relatively small cross section, the channel beams and tie rods being adapted to move downwardly relative to said stationary casing, said channel beams being provided in the web portion with a row of spaced apertures adapted to receive contact studs therein, and a plurality of contact studs inserted through said apertures with the inner portion of said studs being disposed within the electrode mass, said contact studs being provided with upper and lower lug portions which lie in a plane at an angle to the longitudinal axis of said studs such that when the studs are inserted through the apertures in the channel beams and into the electrode mass the upper and lower lugs will abut the marginal portion of the stud apertures in the beams and automatically position all studs in the desired angular relationship within the electrode mass.

15. A contact stud adapted for use with self-baking electrodes comprising a shank portion adapted to be connected to suitable current carrying means, and a tapered body portion, said body portion being provided with upper and lower lug portions which are diametrically opposed, said lug portions lying in a plane that is at an oblique angle to the longitudinal axis of said stud.

16. A contact stud as in claim 15 wherein the surface of the lugs facing away from the shank end are substantially flat.

EDGAR F. HENDERSON.

References Cited in the file of this patent

UNITED STATES PATENTS

| Number | Name | Date |
|---|---|---|
| 1,757,695 | Westly | May 6, 1930 |
| 2,073,356 | Torchet | Mar. 9, 1937 |
| 2,159,183 | Sem | May 23, 1939 |
| 2,169,563 | Legeron | Aug. 15, 1939 |
| 2,330,576 | Hagerup-Larssen | Sept. 28, 1943 |
| 2,337,279 | Sem et al. | Dec. 21, 1943 |
| 2,339,230 | Hagerup-Larssen | Jan. 14, 1944 |

FOREIGN PATENTS

| Number | Country | Date |
|---|---|---|
| 454,584 | Great Britain | Oct. 5, 1936 |